(12) United States Patent
Flick

(10) Patent No.: US 6,411,900 B1
(45) Date of Patent: Jun. 25, 2002

(54) REDUCED THROUGHPUT TRACK DATA ASSOCIATION USING LOOK-UP TABLES

(75) Inventor: Thomas E. Flick, Windemere, FL (US)

(73) Assignee: Lockhead Martin Corporation, Bethesda, MD (US)

( * ) Notice: Subject to any disclaimer, the term of this patent is extended or adjusted under 35 U.S.C. 154(b) by 0 days.

(21) Appl. No.: 09/817,160

(22) Filed: Mar. 27, 2001

(51) Int. Cl.[7] .............................................. G06F 17/00
(52) U.S. Cl. ...................................... 701/223; 342/455
(58) Field of Search ................................. 701/223, 207; 342/147, 417, 146, 113, 444, 118, 159, 162, 455

(56) References Cited

U.S. PATENT DOCUMENTS

| | | | |
|---|---|---|---|
| 4,806,936 A | * 2/1989 | Williams et al. | 342/126 |
| 5,504,489 A | 4/1996 | Kronhamn | 342/118 |
| 5,557,543 A | * 9/1996 | Parsons | 701/207 |
| 5,587,929 A | 12/1996 | League et al. | 342/159 |
| 5,657,251 A | 8/1997 | Fiala | 342/162 |
| 5,696,516 A | 12/1997 | Julian | 342/118 |
| 5,842,156 A | 11/1998 | Hong et al. | 702/179 |
| 5,848,377 A | 12/1998 | Wong | 701/226 |
| 5,877,722 A | 3/1999 | Shams | 342/147 |

* cited by examiner

*Primary Examiner*—William A. Cuchlinski, Jr.
*Assistant Examiner*—Marthe Y. Marc-Coleman
(74) *Attorney, Agent, or Firm*—Burns, Doane, Swecker & Mathis, LLP

(57) ABSTRACT

A system for rapidly associating a set of tracks with a set of sensor observations. Look-up tables are formed, with each look-up table being associated with a portion of a geometric surface surrounding the sensor so that the table cells correspond to various directions in free space in which sensor observations may be made. On the edges of each look-up table are overlap boundary rows of cells which contain the same sensor data as cells of the adjacent table. The observations from a sensor are populated into the tables based upon the directional orientation of the observations. Predicted values are calculated for each target object data track, and groups of cells surrounding the predicted values are searched for sensor observation data to match with each track. Having overlap boundary rows for each table which contain redundant data from the edge of the adjacent table allows the search for sensor data to match with a track to be performed within a single table.

20 Claims, 6 Drawing Sheets

TABLE 4 (t = 0)

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 1 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

TABLE 5 (t = 0)

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

TABLE 4 (t = 1)

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 1 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

TABLE 5 (t = 1)

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

TABLE 4 (t = 2)

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 1 | 0 | 0 | 0 | 0 | 0 |
| 0 | 0 | 0 | 0 | 0 | 0 | 0 | 0 | 0 |

TABLE 5 (t = 2)

| 0 | 0 | 0 | 1 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 4

REDUCED THROUGHPUT TRACK DATA ASSOCIATION USING LOOK-UP TABLES

FIELD OF THE INVENTION

The present invention relates to the handling of remote sensor data of detected objects. In particular, the present invention involves a method and apparatus for matching sensor data or observations of detected objects to tracks of past object detections.

BACKGROUND OF THE INVENTION

The ability to remotely sense and track target objects is useful in a wide array of military and scientific applications. Typically, remote sensing techniques may involve gathering information by using various instruments to measure electromagnetic fields, electromagnetic radiation, or acoustic energy. Remote sensing instruments may include, for example, imaging sensors, cameras, radiometers, scanners, lasers, radio frequency receivers, radar systems, sonar, thermal devices, seismographs, magnetometers, gravimeters, scintillometers, or other like instruments. Imaging sensors for remote sensing purposes include low-light-level CCD, FLIR, MMW radar, PMMW cameras, or the like.

Remote sensing is achieved with a forward looking infrared (FLIR) system by using the FLIR to detect and measure thermal or photonic energy emanating from a distant object. FLIR sensors are often used to identify, categorize, and track remote target objects. In some applications, FLIR sensors are linked to weapon systems for providing guidance input and weapon fire control.

Once an object has been detected, it may be tracked over time by linking subsequent detections of the object. To track an object, a series of sensor detections taken over a period of time must be linked to the object of interest with an acceptable amount of certainty. This may be achieved by comparing the history of past sensor detections, that is, the track of the object, to the object's next expected orientation relative to the sensor. In this way, the most recently received sensor detection may be linked or associated with the track of an object. A detection can be positively identified as the object being tracked based on the distance between the detection and the track or expected position. This allows detections to be "associated" with the track by measuring the distance between a track-detection pair.

The processing of new detections, or observations, becomes much more complicated as the number of objects being tracked increases. The detections which are close to an expected position become candidate associations for a track. With conventional systems, this involves a comparison of each detection with every track. When there are a large number of detections (N) and tracks (M), the computational costs become prohibitively large using such conventional systems. The computational cost of associating N number of detections with M number of tracks is roughly proportional to N×M.

SUMMARY OF THE INVENTION

The present invention satisfies a need recognized by the inventor to rapidly and efficiently associate a set of tracks with a set of observations. In accordance with the present invention, observations from various orientations are populated into a set of look-up tables which cover the three-dimensional free space directions of interest. Since nearby table entries are also nearby in position, valid track-detection pairs may be found by searching the table entries adjacent an expected position. Because a cell which is adjacent the expected cell may fall in the next table, the edges of the tables are extended to include overlap boundary edges having cells which are redundant to the adjacent table. In this way, all the cells of interest surrounding an expected cell can be searched by looking in one table. Association of a set of tracks with a set of observations is made more efficient sing the look-up table method in accordance with the present invention.

One advantage of the present invention is that the efficiencies realized in the resultant processor load become roughly linear in proportion to N+M, rather than being proportional to N×M as with conventional systems. By using the present invention, the computational burden decreases by a factor of approximately N, which may result in a magnitude or more in throughput. By reducing the computational load of track-detection association, the present invention enables lower cost, smaller sized, less complex hardware to be used. The present invention may be used with any detection and tracking system which has a large track load and high update rates.

A preferred embodiment of the present invention associates a number of observation data tracks with the observations from a sensor such as a laser radar. This is achieved by having a plurality of tables which each have cells for storing data of said sensor observation. Each of the tables is correlated to a portion of a geometric surface, and each of the tables has rows of overlap boundary cells along one or more of the edges of the table. The overlap boundary cells contain data which is redundant to the adjacent cells of the adjoining table. The sensor observation data is stored in the appropriate table. Data that is stored near the edge of a table will also be redundantly stored in the overlap boundary cells of the adjoining table. A predicted location for each track is calculated in one of the tables, and the table cell and surrounding cells are searched. The observation data track is associated with a sensor observation if the sensor observation is within the predicted cell or in the surrounding cells.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

FIG. 4 depicts table entries of from time t=0 to t=2 for data linked with the polyhedron face of FIG. 3;

DETAILED DESCRIPTION OF PREFERRED EMBODIMENTS

A number of exemplary embodiments of the invention will now be described in greater detail, with some aspects of the invention described in terms of sequences of actions to be performed by elements of a processor or computer system. It will be recognized that various actions disclosed herein may be performed by hard-wired electrical circuits, or by processor program instructions performed on one or more processors, or by some combination of each. Other embodiments of the invention may be comprised entirely of instructions stored in a computer readable storage medium, for execution by one or more processors to implement the methods and systems of the invention. All of these various forms and embodiments are contemplated to be within the scope of the invention.

Figure 1:
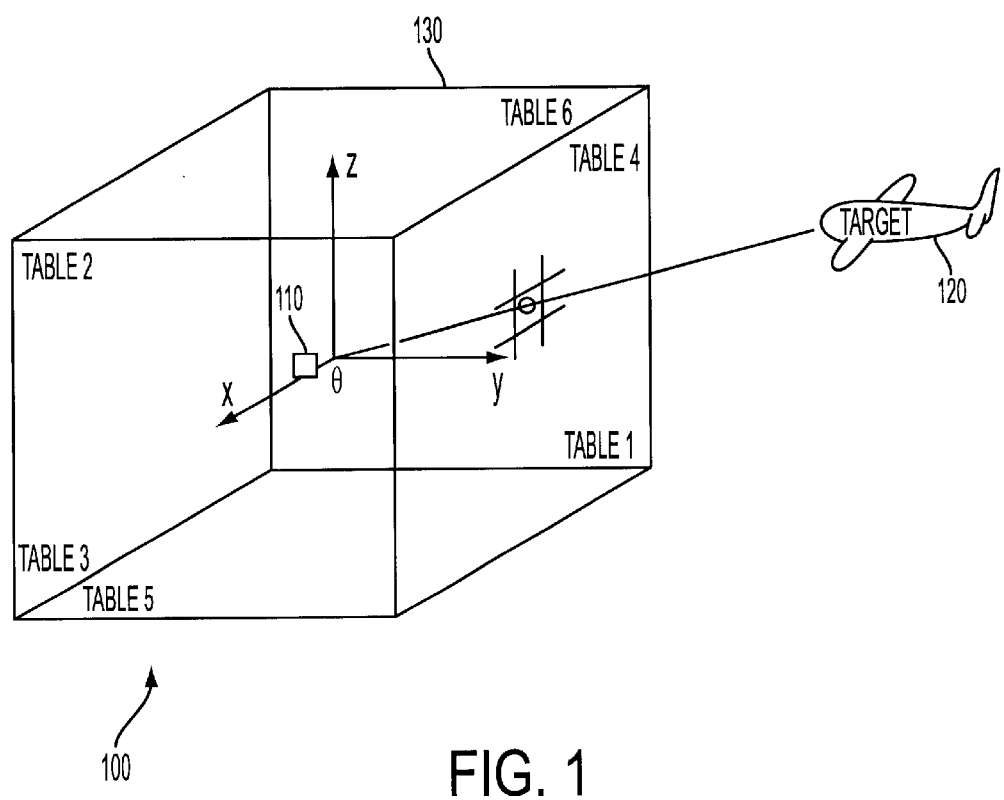
FIG. 1 depicts a system 100 in accordance with a preferred embodiment of the present invention.

FIG. 1 depicts a system 100 in accordance with a preferred embodiment of the present invention. In the figure, a sensor 110 is shown detecting a target object 120. In a preferred embodiment of the present invention, the sensor 110 is a laser radar. In alternate embodiments, however, the sensor 110 may be any sensor means such as a laser radar, RF radar, low-light-level CCD, FLIR, PMMW cameras, or like type of sensor.

An imaginary polyhedron 130 is shown surrounding the sensor 110. The polyhedron 130 may be thought of as a geometric surface which serves as an analytical tool for compartmentalizing and associating data from various objects. Each face of the polyhedron 130 is made up of rows and columns of cells of cells which correspond to various orientations at which a target 120 may be detected in relation to the sensor 110. For example, when the sensor 110 detects the target 120 in the particular orientation illustrated in the figure, the detected signal passes through an imaginary cell 131 which is part of the face of the polyhedron 130. In addition, each face of the polyhedron 130 corresponds to a table having cell entries which correspond to the cells of the polyhedron 130 face. For example, a data point detected in cell 131 indicates a particular orientation between the sensor 110 and the target object 120. If a sensor 110 detects a target object at that particular orientation, the data point is stored in the appropriate row and column of Table 4 corresponding to cell 131 of the polyhedron 130. In this manner, for the cubical polyhedron 130 embodiment shown in FIG. 1, a detection made at any possible orientation will be populated into a particular cell within one of the six tables which correspond to the six sides of the imaginary cube.

In the figure, the orientation of the sensor 110 is defined by a set of arbitrary orthogonal axes, labeled X, Y and Z. In the embodiment depicted in the figure, the position of the sensor is labeled as the origin (0,0,0). The present invention can be practiced using other coordinate systems, or techniques for defining orientation, known to those of skill in the art.

Figure 2A:
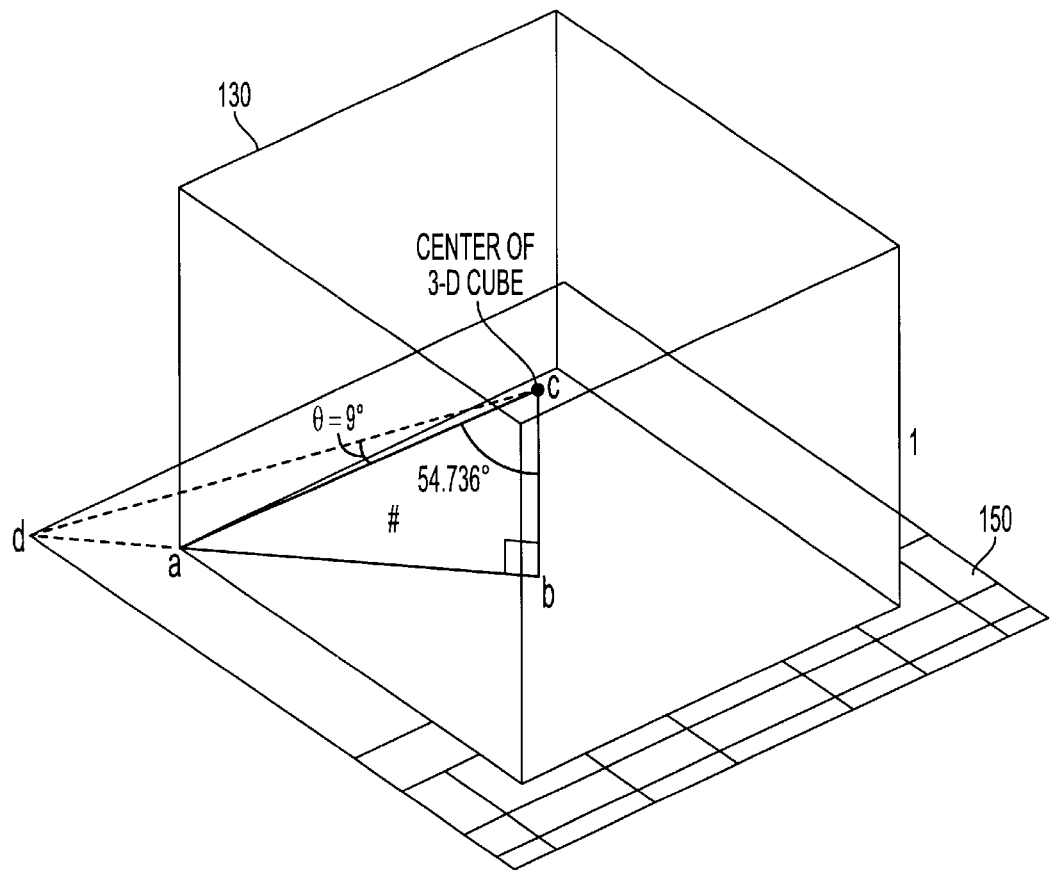
FIG. 2A depicts an imaginary three-dimensional cubicle polyhedron with six faces covering the orientation angles of interest between a sensor and a target object.

FIG. 2A depicts an imaginary three-dimensional cubicle polyhedron with six faces covering the orientation angles of interest between a sensor 110 and a target object 120. The figure also depicts an internal slice of the imaginary polyhedron 130 having labels associated with certain computational parameters, in accordance with the present invention.

Each table associated with a face of the polyhedron 130 comprises additional table entries which are associated with overlap boundary cells of the face which extend further than the face, to surround each face of the polyhedron 130. For example, the overlap boundary edge for the bottom face of polyhedron 130 is shown as overlap boundary 150 in FIG. 2A. In a preferred embodiment, one row of cells surrounds each face of the polyhedron 130. In other alternative embodiments, more than one row of cells may be provided to surround each face. Although, for the sake of illustrative clarity, only the overlap boundary cells for the bottom face of polyhedron 130 are shown in FIG. 2A, in practice, each of the cube faces of interest for polyhedron 130 has overlap boundary cells associated with it.

In a preferred embodiment, the sensor 110 located in the center of polyhedron 130 spans a coverage area of $\pi/2$ radians, in each of the XY, YZ and ZX planar directions, in sensing signals coming through each planar face of the polyhedron 130, not including the overlap boundary cells. That is, each face of the polyhedron 130 is $\pi/2$ radians high and $\pi/2$ radians wide, as viewed from the sensor 110.

Referring to FIG. 1, with a sensor 110 pointing in the Y direction, for example, the sensor 110 would rotate $\pm\pi/4$ radians in the X direction, and also $\pm\pi/4$ radians in a Z direction in order to detect all cells within the Table 4 face of the polyhedron 130. Each table associated with a face additionally has data entries for the overlap boundary cells which extend beyond each face of polyhedron 130 by $\pm\pi/4$ radians. Therefore, to account for the overlapping boundary cells of each face, the data detected by sensor 110 for the row of cells beyond each polyhedron 130 face (i.e., the overlap boundary cells) is also assigned to the table for that face. That is, for the Table 4 face (in the +Y direction) the sensor 110 detects signals from $\pm(\pi/4+\theta)$ radians in the X direction and $\pm(\pi/4+\theta)$ radians in the Z direction, to detect all cells within the Table 4 face of the polyhedron 130 including the Table 4 overlap boundary cells. In accordance with the present invention, an overlap parameter P defines the amount by which the boundary cells overlap each face of the polyhedron 130.

Figure 2B:
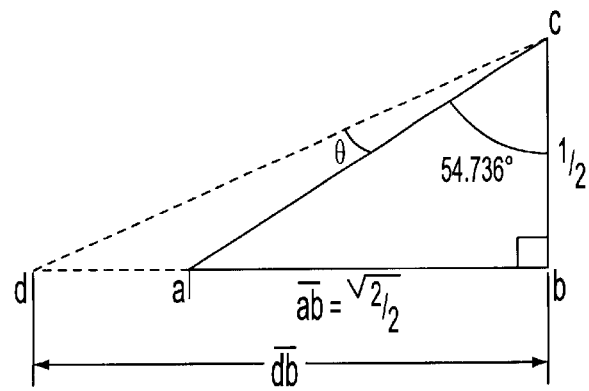
FIG. 2B graphically depicts some parameters associated with the present invention.

FIG. 2B graphically depicts some parameters associated with the present invention. The overlap parameter, P, is graphically represented in FIG. 2B as the ratio of the line $\overline{db}$ to the line $\overline{ab}$ such that $P=\overline{db}/\overline{ab}$. If the imaginary polyhedron 130 is defined to have sides equal to a length of 1, then the overlap parameter P may be expressed as follows:

$$P = \frac{\tan[\arctan(\sqrt{2}) + \theta]}{\sqrt{2}} \quad (1)$$

In equation (1), P is the overlap parameter, and $\theta$ is the overlap angle. In accordance with a preferred embodiment, the overlap angle $\theta$ spans one cell width beyond the edge of the imaginary polyhedron 130 in the manner shown in FIG. 2A. The overlap angle $\theta$ is the additional angle the sensor 110 must rotate beyond the edge of the polyhedron 130 to detect signals coming in the through the additional distance $\overline{da}$ extending beyond the cube face, e.g., through the overlap boundary cells. Alternatively, the overlap parameter P may be thought of as the amount that a face of the polyhedron 130 must be stretched in order to add a border around the polyhedron 130 which spans an arc of an angle $\theta$. The overlap parameter P is computed along the cube face diagonal, as shown in FIG. 2A. In accordance with one embodiment of the present invention, P is computed along the cube face diagonal because that is the worst case for which the least angular change per unit "stretch" is achieved. The angular width of the border, i.e., overlap angled $\theta$, may be thought of as the angle measured by an observer stationed at the center of polyhedron 130 of the overlap boundary 150.

Each face of the polyhedron 130, plus the overlap boundary cells, comprises a number of cells which are each associated with a table entry. The number of rows of cells on each face of the cube, including the overlap boundary cells, is represented by the parameter $R_{LT}$, which may be determined as follows:

$$R_{LT} = [2(\pi/4)/\theta] + 2 \quad (2)$$

In a preferred embodiment of the present invention, the number of rows of the polyhedron 130 is the same as the number of columns. In alternative embodiments, the invention may be practiced with a number of rows which is different from the number of columns. The number of rows $R_{LT}$, and/or the number of columns, may be varied in accordance with the present invention to conform to the constraints of the detector hardware or processing capabilities which are available. For example, the respective numbers of rows and columns may be adapted to the respective sensor resolution in the vertical versus horizontal directions.

A scale parameter, $S_{LT}$, for use in accordance with the present invention may be determined as follows:

$$a = \frac{1}{\sqrt{1+p^2}} \quad (3)$$

$$S_{LT} = \frac{1}{\arccos(a)} \quad (4)$$

In the above equations (3) and (4), the variable "a" is a computational parameter for use in calculating the scale parameter $S_{LT}$.

In one embodiment of the present invention, the sensor 110 is able to detect target object return signals from any direction, as shown in FIG. 1. The signal from a target object 120 detected from a particular direction passes through at least one of the six sides of the imaginary polyhedron 130, each side of the polyhedron 130 being associated with a table of data for storing sensor information. Data associated with a signal detection is entered into the cell corresponding to the direction of the detection, i.e., the cell of the polyhedron 130 through which the signal passed. For example, the sensor data from the detection of target object 120 is entered into cell 131 of Table 4, as shown in FIG. 1. In addition to the cells of each face of the imaginary polyhedron 130, each table associated with a face of the cube has an additional pair of rows and columns of overlap boundary cells. A detected target signal which passes through an overlap boundary cell of one face, also passes through a cell of the adjacent face. Moreover, if the target signal passes through an overlap boundary cell at the corner of a face, the signal may also pass through the cells of both adjacent faces. For example, a signal detected in an overlap boundary cell at the top of Table 4 would also appear as data within a cell of the Table 6. Thus, the boundary cells, or overlap cells, of a table contain information redundant to the cells of the adjacent table.

Figure 3A:
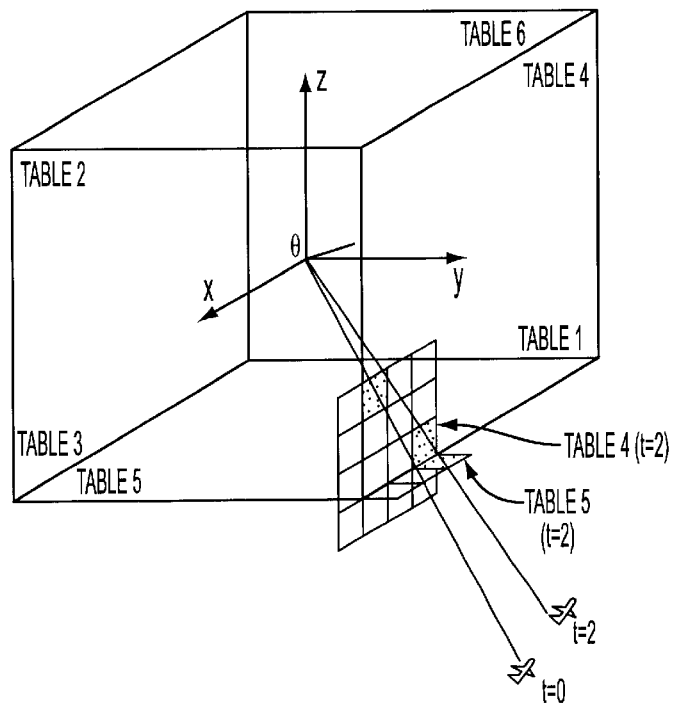
FIG. 3A depicts the system 100 with a target shown at time t=0 and again at time t=2.

FIG. 3A depicts the system 100 with a target shown at time t=0 and again at time t=2. The figure also depicts the two cells of Table 4 which receive sensor indications of the target at times t=0 and t=2 respectively. In addition, the figure depicts the overlap boundary cell of Table 5 which receives an indication of the target at time t=2. As can be seen from the figure, at time t=2 the signal from the target object is received in both Table 4 as well as in an overlap boundary cell of Table 5.

Figure 3B:
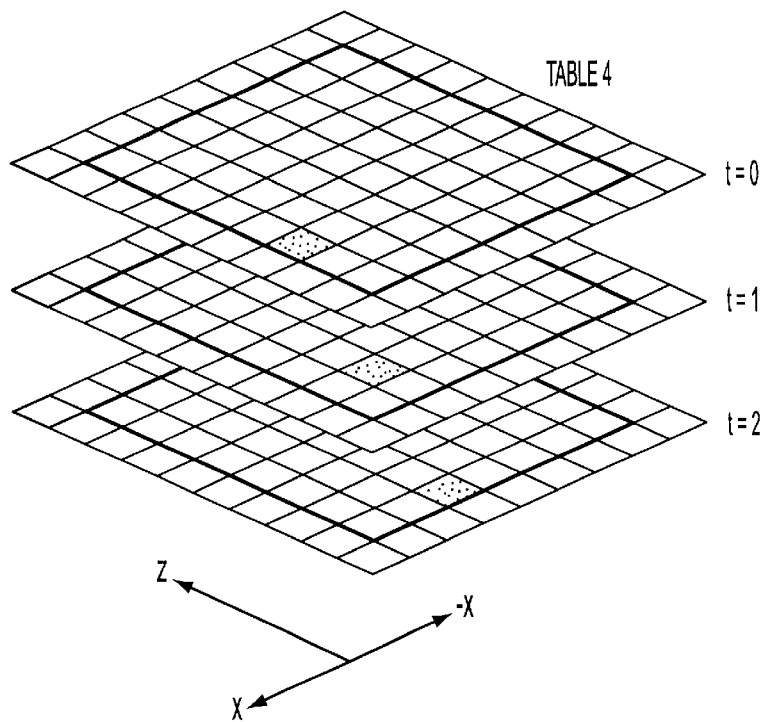
FIG. 3B depicts three iterations for times t=1 to t=2 of the face of the imaginary polyhedron 130 which corresponds to data Table 4.

FIG. 3B depicts three iterations for times t=1, t=1 and t=2 of the face of the imaginary polyhedron 130 which corresponds to data Table 4. The Table 4 face shown in FIG. 3 is depicted from the perspective of the sensor from this inside of the polyhedron 130 looking out. This may be seen by comparing the x axis and z axis shown in FIG. 3 with those of FIG. 1.

The darkened squares of the Table 4 face in the figure indicate a detection in that cell of the polyhedron 130 face. As shown in the figure, the target object being detected from time t=0 to t=2 is moving across Table 4 in the negative z direction and the positive x direction. At time t=2 the detected target appears one cell away from the bottom edge of the Table 4 face.

FIG. 4 depicts the table entries of Table 4 from time t=0 to t=2 in the left three tables, and the corresponding table entries of Table 5 from time t=0 to t=2 in the right three tables. Again, the information associated with the detected target object can be seen to be moving across and down the versions of the Table 4 taken at time t=0, t=1 and t=2. The target object cannot be seen in Table 5 for times t=0 and t=1. However, at time t=2, the target object is simultaneously detected in Table 4 and in an overlap boundary cell of Table 5. As can be seen in FIG. 1 and FIG. 3A, Table 5 is adjacent to Table 4 at the edge of the polyhedron faces. Hence, an overlap boundary edge provides redundant detection information, as the target object approaches the edge of a cell face (and the edge of the corresponding table) since the same target object detection may appear in both Table 4 and in Table 5.

In the example illustrated in the figures, the target object is detected in a cell of Table 4, and at the same time the same target object is detected in a corresponding overlap boundary cell of Table 5 at time t=2. In other embodiments or in other situations, the signal from the target object at t=2 may pass through the cell of Table 4 shown in FIG. 3A, but not pass through the overlap boundary cell of Table 5, as shown. For example, a signal passing only through the very topmost portion of the Table 4 cell shown in the figure could conceivably miss the adjacent overlap boundary cell of Table 5.

Figure 5:
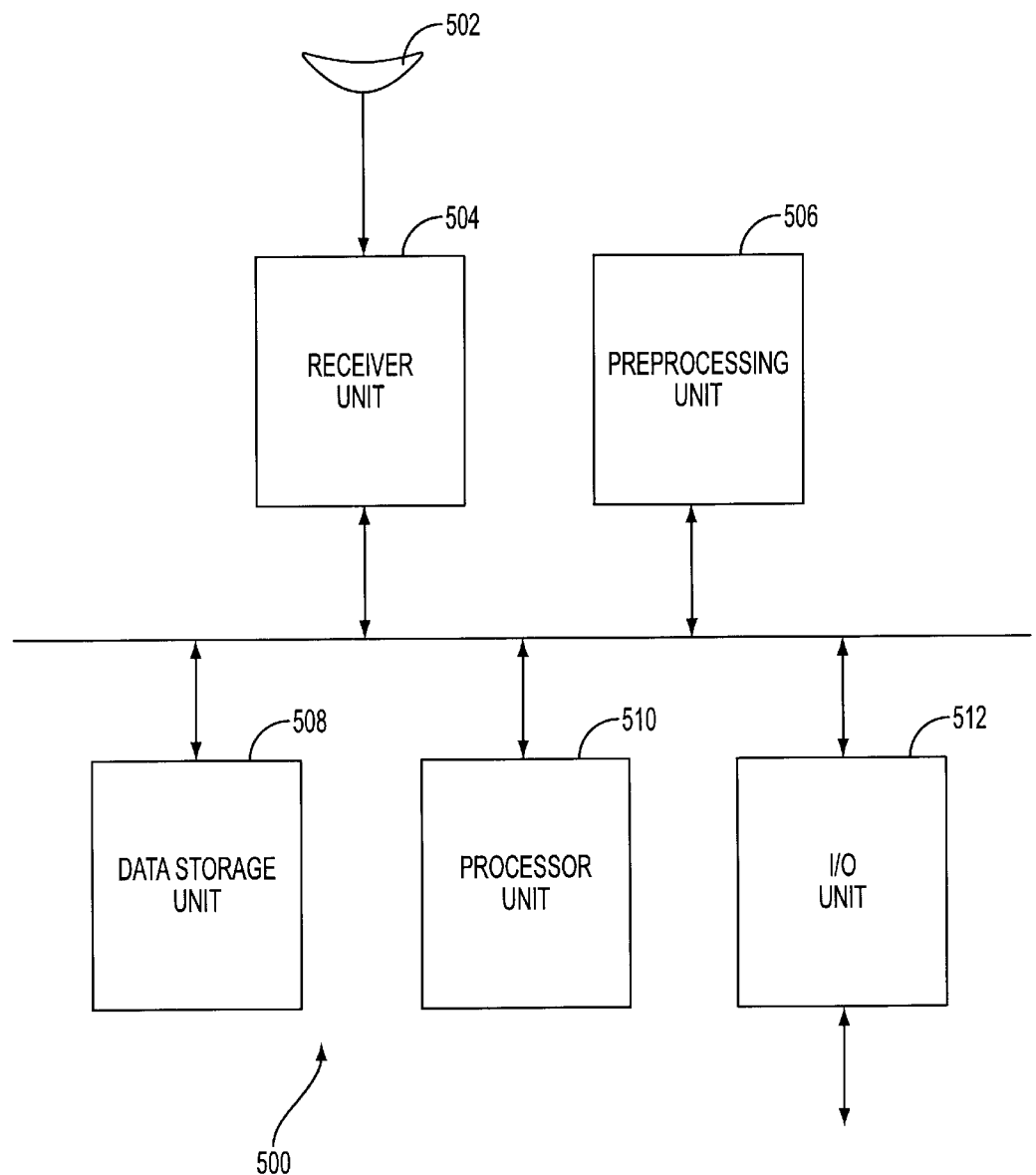
FIG. 5 depicts a block diagram of a system 500 in accordance with a preferred embodiment of the present invention.

FIG. 5 depicts a block diagram of a system 500 in accordance with a preferred embodiment of the present invention. The system 500, which may be a radar system or other like sensor means, may be embodied as a passive detection system which only receives signals. Alternatively, the present invention may be an active system in that it transmits signals and receives a return signal, in which case the system also includes a transmitter for sending signal. The system 500 includes an antenna 502, a receiver unit 504, a pre-processing unit 506, a data storage unit 508, a processor unit 510 and an input/output (I/O) unit 512, interconnected as shown or in a like manner for receiving and processing a signal from a target object.

Signals from a target object are received at receiver 504 via antenna 502. The received signals are pre-processed in a pre-processing unit 506. Depending upon the type of sensor being used and the configuration of the sensor system 500, the pre-processing may include low pass filtering, A/D conversion, and frequency domain integration, e.g., fast Fourier transform (FFT) filtering. A processor 510 is used to further process the signal, including the processing for matching received signal data with existing target object tracks of past received signals.

During various stages of signal processing, signal manipulation and computation, signals can be saved, stored and retrieved in data storage unit 508, or like type of memory. An input/output (I/O) unit 512 may be provided to communicate information, data and control signals between the system 500 and outside systems or human operators.

Figure 6:
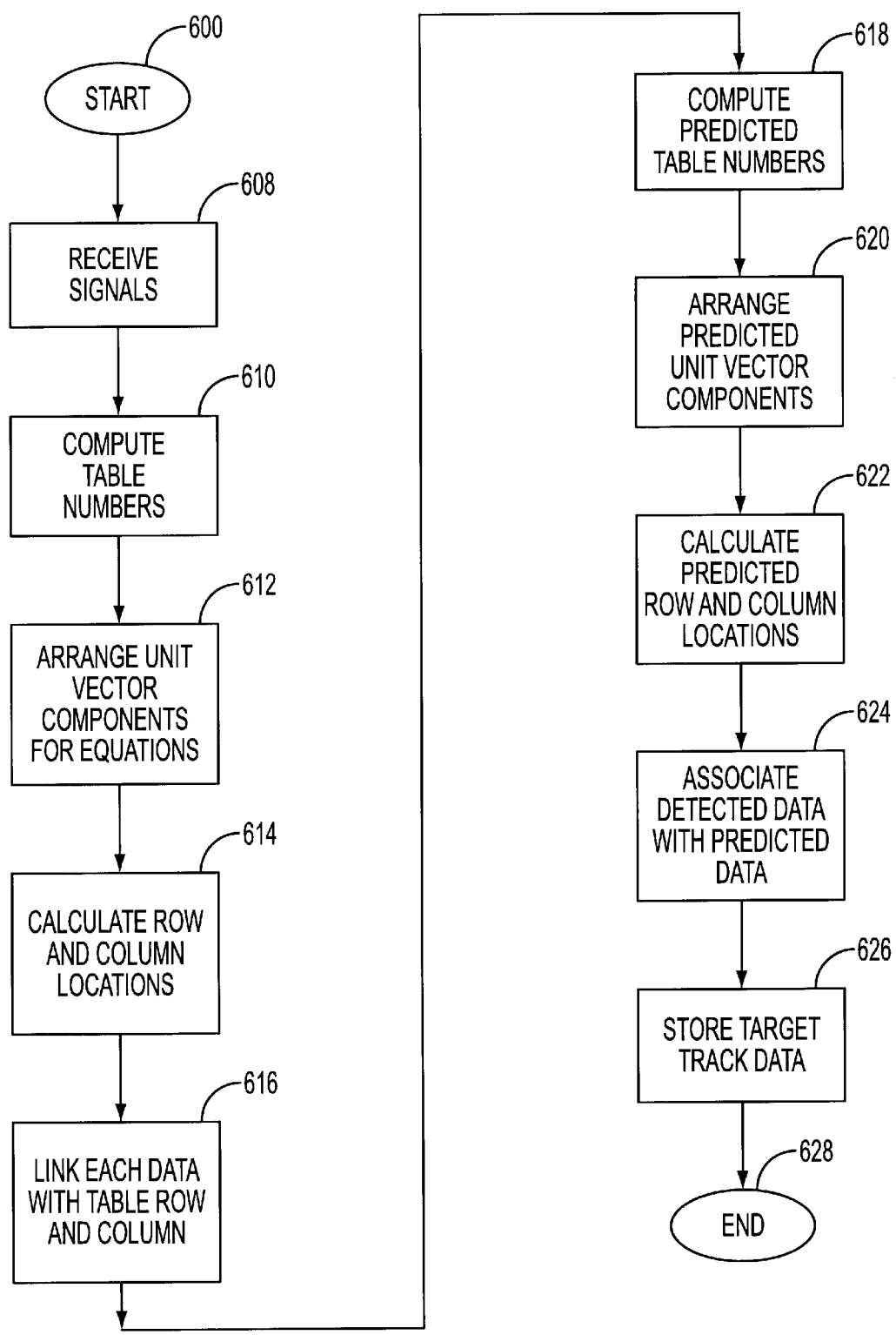
FIG. 6 depicts a method flowchart in accordance with an exemplary embodiment of practicing of the present invention.

FIG. 6 depicts a method flowchart in accordance with an exemplary embodiment of practicing the present invention.

The initial steps of the method involve filling the tables with detections from the sensor. Once the sensor data has been populated into the tables, the existing tracks of various target objects are matched with candidates for association.

The method begins in step 600, and in step 608 a signal received by the sensor 110 is provided to the system for signal processing. In a preferred embodiment, the signal is received by a receiver section via an antenna, and fed to a signal processor for processing real time, or with very little delay. Alternatively, the present invention may be practiced with data received in the past, or retrieved from a storage medium. The sensor data of the received signal, referred to as a "detection," may correspond to one target object among the one or more target objects being presently tracked by the system.

The method then proceeds to step 610 for computation of the table number, or table numbers, of the one or more tables to be used for storing the detection. Because the faces of polyhedron 130 have overlap boundary edges which overlap with adjacent sides of the polyhedron, a single detection may be stored in two tables, or even in three tables. For example, a detection which occurs near an edge of the cube (but not at a corners) could appear in two tables, as described in conjunction with FIG. 4. Similarly, a detection which is sensed near one of the corners of the polyhedron 130 could appear in all three tables intersecting at the corner.

For each detection position, UX, UY, UZ, the table numbers of one or more tables may be found in accordance with the following relationships:

$$P*abs(UX) > max\{abs(UY), abs(UZ)\}, \text{ then } N_{LT}=1.5+0.5*sign(UX) \quad (5)$$

$$P*abs(UY) > max\{abs(UX), abs(UZ)\}, \text{ then } N_{LT}=3.5+0.5*sign(UY) \quad (6)$$

$$P*abs(UZ) > max\{abs(UX), abs(UY)\}, \text{ then } N_{LT}=5.5+0.5*sign(UZ) \quad (7)$$

In the above equations, the function "abs(x)" indicates the absolute value of the "x" coordinate value of the unit vector pointing towards the target object detection. The function "sign(x)" is equal to +1 for $x \geq 0$ and is equal to −1 for $x<0$. The parameters UX, UY and UZ are the x, y and z components of the unit vector pointing towards the target object detection.

Upon determining the table numbers in which a particular detection appears in step 610, the method proceeds to step 612. In step 612 the unit vector components UX, UY and UZ are rearranged and associated with vector components specific to each table number as follows:

$$\text{For } N_{LT}=1 \text{ or } 2, \text{ let } (U,V,W)=(UX, UY, UZ) \quad (8)$$

$$\text{For } N_{LT}=3 \text{ or } 4, \text{ let } (U,V,W)=(UY, UX, UZ) \quad (9)$$

$$\text{For } N_{LT}=5 \text{ or } 6, \text{ let } (U,V,W)=(UZ, UX, UY) \quad (10)$$

In the above equations, the variables UX, UY and UZ represent the respective unit vector components of a detection vector. By rearranging the unit vector components in accordance with equations (8), (9) and (10), the same relationships may be used for specifying a particular cell in the rows and columns of each table. That is, by rearranging the unit vector components, this embodiment of the present invention is able to use one set of equations to compute the row and column table location corresponding to a detection position. Upon completing step 612, the method proceeds to step 614.

In step 614, for the one or more table specified in step 610, calculations are performed to determine the row and column locations corresponding to cells indicated as having detections. In accordance with an exemplary embodiment of the present invention, the row and column table locations corresponding to cell detections may be determined with the following equations:

$$f(U)=S_{LT}*arccos(abs(U))/sqrt(1-U*U) \quad (11)$$

$$Row_{LT}=0.5*R_{LT}*(W*f(U)+1) \quad (12)$$

$$Col_{LT}=0.5*R_{LT}*(V*f(U)+1) \quad (13)$$

The use of the scale factor $S_{LT}$ in effect "folds" in the corners of the polyhedron 130. To some extent, this folding effect tends to reduce the difference in distance from the sensor (i.e., center of the cube) to the center of a cube face and the corner of the cube. In other words, the scale factor used in the row-column location function, f(U), mashes the corners of the polyhedron 130 so that it becomes somewhat more spherical or rounded in shape. Upon completing step 614 to compute the row and column table locations of the one or more detection cells, the method proceeds to step 616.

In step 616, each detection is "linked" with a row and column of a table, e.g., ($Row_{LT}$, $Col_{LT}$) of Table 1. As explained in conjunction with FIG. 4, a single detection may be linked, or associated, with more than one table. Additionally, since the system may simultaneously be tracking a plurality of targets, there may be multiple detections for each iteration of populating the tables. Hence, it is likely that a number of cells from various tables will be populated with data corresponding to detections of the various targets being tracked. Furthermore, it is possible that the same cell may have more than one detection contained therein. That is, it is possible that two of the multiple targets being tracked will be in the same line of sight from the perspective of the sensor 110. This becomes increasingly likely as fewer cells, $R_{LT}$, are used in a particular table.

By linking each detection to its appropriate table cell in step 616, the sensor data is effectively populated into the set of tables. Once step 616 has been completed, the tables will have been populated with detection data from the sensor. The method then proceeds to step 618 to begin associating candidate detections—that is, cells of the tables containing indications of detections—with the tracks of the one or more objects being tracked.

In steps 618–624, the method of the present invention calculates a predicted target position for each of the target objects being tracked. These steps are similar to steps 610–616, except that there is no allowance for overlap. Once the predicted target positions associated with each track have been calculated, a distance is measured between the predicted target positions and the detection data which has been populated into the tables in steps 610–616. The calculation of predicted target positions begins in step 618 in accordance with the following equations:

$$abs(UX\_Pred) \geq max\{abs(UY\_Pred), abs(UZ\_Pred)\}, \text{ then } N_{LT}=1.5+0.5*sign(UX\_Pred) \quad (14)$$

$$abs(UY\_Pred) > max\{abs(UX\_Pred), abs(UZ\_Pred)\}, \text{ then } N_{LT}=3.5+0.5*sign(UY\_Pred) \quad (15)$$

$$abs(UZ\_Pred) > max\{abs(UX\_Pred), abs(UY\_Pred)\}, \text{ then } N_{LT}=5.5+0.5*sign(UZ\_Pred) \quad (16)$$

In equations (14), (15) and (16), the parameters UX_Pred, UY_Pred and UZ_Pred are the predicted target position values for unit vectors in the X, Y and Z directions, respectively. Once the predicted table numbers, $N_{LT}$, have been computed using equations (14)–(16), the method proceeds to step 620.

In step 620, similar to step 612 previously performed, the unit vector components are rearranged, depending upon the table number, in the following manner:

For $N_{LT}$=1 or 2, let $(U,V,W)=(UX\_Pred, UY\_Pred, UZ\_Pred)$ (17)

For $N_{LT}$=3 or 4, let $(U,V,W)=(UY\_Pred, UX\_Pred, UZ\_Pred)$ (18)

For $N_{LT}$=5 or 6, let $(U,V,W)=(UZ\_Pred, UX\_Pred, UY\_Pred)$ (19)

Upon completing step 620 to rearrange the unit vector components, the method then proceeds to step 622 for computation of the row and column table locations corresponding to track positions. The predicted row and column cell positions may be calculated in accordance with the following equations in one embodiment:

$$f_{PRED}(U)=S_{LT}*arccos(abs(U))/sqrt(1-U*U) \quad (20)$$

$$Row_{LT\_PRED}=0.5*R_{LT}*(W*f(U)+1) \quad (21)$$

$$Col_{LT\_PRED}=0.5*R_{LT}*(V*f(U)+1) \quad (22)$$

Upon calculating the predicted row and column table locations of the predicted cells in step 622, the method then proceeds to step 624 for analysis to associate predicted cells with detection data in the tables from steps 608–616. One factor used in determining whether a detected data value is associated with a predicted cell is the distance between the detected value and the predicted cell.

In evaluating the data detections and predicted cells, a preferred embodiment of the present invention uses a 3×3 cell region centered at the track's ($Row_{LT\_PRED}$, $Col_{LT\_PRED}$) table location. The use of a 3×3 cell region increases the probability of finding an association between a predicted value and a detected value if there is any error in the prediction. In other words, the predicted value does not have to indicate the exact table cell in which a detection will occur, in order to determine a valid association. This is useful for targets which behave in an erratic or unpredictable manner, e.g., make sudden accelerations or sharp turns. Once the predicted cells have been associated with detection data to extend the target object's track, the predicted cells are stored in a target object track database.

Alternative embodiments may use other than a 3×3 cell region to search for data detections. For example, a 5×5 cell window can be used. However, in a 5×5 cell window embodiment, the number of rows/columns of the overlap boundary edges should be adjusted accordingly. If the center cell of a 5×5 window is placed on a cell adjacent the border cells to correspond to a predicted cell, two rows of the 5×5 window extend into the overlap boundary region. Hence, the structure of the tables would be adapted to have two rows of overlap boundary cells instead of one row, to accommodate the two rows that the 5×5 window could extend into the overlap boundary region. Similarly, a 7×7 window would have three rows in each overlap boundary edge.

The imaginary polyhedron 130 enclosing the sensor 110 is a geometric surface which is an imaginary, mathematical construct developed for the purpose of explaining and describing the invention. The cube shown in the figures is useful in explaining how the invention was developed and some of the properties of the invention, but the present invention is not necessarily limited to this particular geometric construct. The imaginary polyhedron 130 surrounding the sensor 110 serves as a tool for associating sensor data, taken over a period of time, with the various objects being tracked by the system. For ease of illustration, the exemplary embodiments discussed herein are described as being a cubical box. However, the present invention may comprise geometric surfaces consisting of three dimensional shapes other than the cubical box used for illustrative purposes herein. For example, instead of a cube, the polyhedron 130 could take the form of a wedge shape, e.g., the cube shown in FIG. 1 cut top-to-bottom in half from corner to corner. In addition, although the present invention is disclosed herein in terms of a polyhedron with planar surfaces, the shapes of the surfaces may be other than planar, e.g., concave surfaces.

In alternative embodiments, the sensor 110 may be located in a position within the polyhedron 130 other than the centermost point. In some embodiments, the sensor 110 is positioned such that the polyhedron 130 completely surrounds the sensor 110 from all orientation angles, while in other embodiments the sensor 110 is positioned such that the polyhedron 130 does not completely surround the sensor 110, e.g., the sensor may be located on a face of the polyhedron 130. In embodiments where the polyhedron 130 does not completely surround the sensor 110, the number of tables is adjusted accordingly. That is, six tables may be used to cover all degrees of orientation from the sensor 110 using a cubical polyhedron 130. Fewer than six tables may be used if the sensor does not detect target objects in all directions (e.g., with embodiments where the polyhedron 130 does not completely surround the sensor 110). For those embodiments other than the cubical polyhedron 130 shown in the figures, the techniques for determining orientation of target objects to the sensor 110 and storing sensor data into tables are adjusted accordingly to suit the polyhedron shape and sensor position relative to the polyhedron.

Thus, it is not necessary for the scan pattern or coverage of the sensor be aligned with the cube. Nor is it necessary for the sensor to scan the whole cube or even a whole side of the cube. A single iteration of the sensor scan may even cover fractional, disjoint portions of the cube, each portion encompassing multiple faces. Such complicated coverage is within the scope of the present invention.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range in equivalence thereof are intended to be embraced therein.

What is claimed is:

1. A method of associating an observation data track with a sensor observation, the method comprising steps of:

providing a plurality of tables comprising cells for storing data of said sensor observation, each of said plurality of tables being correlated to a portion of a geometric surface, and each of said plurality of tables having overlap boundary edges containing redundant data from adjoining portions of said geometric surface;

storing said data of the sensor observation in one or more of said plurality of tables;

calculating a predicted location in one of said plurality of tables for said observation data track; and searching a predicted cell in one of the plurality of tables, said predicted cell being linked to said predicted location, and searching other cells surrounding said predicted cell in said one of the plurality of tables; and associating said observation data track with said sensor observation if said sensor observation is within the predicted cell or in the surrounding cells.

2. The method of claim 1, wherein said observation data track is one of a plurality of observation data tracks and said sensor observation is one of a plurality of sensor observations.

3. The method of claim 2, wherein the data stored in one of said overlap boundary edges of one of the plurality of tables is redundant to the data stored in an adjoining one of the plurality of tables.

4. The method of claim 3, wherein the data stored in a cell not adjacent to an overlap boundary edge is stored in only one of said plurality of tables.

5. The method of claim 4, wherein said geometric surface is a cube which surrounds a sensor means for detecting said plurality of sensor observations.

6. The method of claim 4, wherein said step of associating said observation data track with said sensor observation comprises:

associating said observation data track with said sensor observation if said sensor observation is within the predicted cell or is in the surrounding cells and is closer to the predicted cell than other observations.

7. The method of claim 4, wherein said predicted location is specified in terms of a predicted column number and predicted row number in one of said plurality of tables.

8. The method of claim 4, further comprising a step of:

computing identities of said plurality of tables for storage of said data of the sensor observation.

9. The method of claim 4, wherein said plurality of sensor observations are detections of a radar system.

10. The method of claim 9, wherein said radar system is a laser radar system.

11. A system which associates an observation data track with a sensor observation, the system comprising:

data storage unit with a plurality of tables comprising cells for storing data of said sensor observation, each of said plurality of tables being correlated to a portion of a geometric surface, and each of said plurality of tables having overlap boundary edges containing redundant data from adjoining portions of said geometric surface;

data bus which receives said data of the sensor observation from the sensor and provides said data of the sensor observation to the data storage unit for storage in one or more of said plurality of tables; and processor which calculates a predicted location in one of said plurality of tables for said observation data track; and wherein said processor searches a predicted cell in one of the plurality of tables, said predicted cell being linked to said predicted location, and searching other cells surrounding said predicted cell in said one of the plurality of tables; and wherein said processor associates said observation data track with said sensor observation if said sensor observation is within the predicted cell or in the surrounding cells.

12. The system of claim 11, wherein said observation data track is one of a plurality of observation data tracks and said sensor observation is one of a plurality of sensor observations.

13. The system of claim 12, wherein the data stored in one of said overlap boundary edges of one of the plurality of tables is redundant to the data stored in an adjoining one of the plurality of tables.

14. The system of claim 13, wherein the data stored in a cell not adjacent to an overlap boundary edge is stored in only one of said plurality of tables.

15. The system of claim 14, wherein said geometric surface is a cube which surrounds a sensor means for detecting said plurality of sensor observations.

16. The system of claim 14, wherein associating said observation data track with said sensor observation involves associating said observation data track with said sensor observation if said sensor observation is within the predicted cell or is in the surrounding cells and is closer to the predicted cell than other observations.

17. The system of claim 14, wherein said predicted location is specified in terms of a predicted column number and predicted row number in one of said plurality of tables.

18. The system of claim 14, wherein identities of said plurality of tables are computed for storage of said data of the sensor observation.

19. The system of claim 14, wherein said system is a radar system.

20. The method of claim 19, wherein said radar system is a laser radar system.

* * * * *